United States Patent
Nakatani et al.

(10) Patent No.: US 7,002,705 B2
(45) Date of Patent: Feb. 21, 2006

(54) IMAGE READING APPARATUS (75) Inventors: Akihiko Nakatani, Kanagawa (JP);
Tadashi Yamamoto, Kanagawa (JP);
Kiyoshi Kaneko, Kanagawa (JP)

(73) Assignee: Canon Research Kaisha, Tokyo (JP)

( * ) Notice: Subject to any disclaimer, the term of this patent is extended or adjusted under 35 U.S.C. 154(b) by 939 days.

(21) Appl. No.: 09/879,195

(22) Filed: Jun. 13, 2001

(65) Prior Publication Data

US 2003/0095300 A1 May 22, 2003

(51) Int. Cl.
*H04N 1/40* (2006.01)
(52) U.S. Cl. ............... 358/1.16; 358/444; 358/404
(58) Field of Classification Search ...... 358/1.15–1.18, 358/1.9, 2.1, 404, 444, 523, 468
See application file for complete search history.

(56) References Cited

U.S. PATENT DOCUMENTS 5,690,406 A * 11/1997 Furukawa et al. .......... 353/25
5,831,674 A * 11/1998 Ju et al. .................. 348/302
5,903,360 A * 5/1999 Honma et al. ............ 358/450

* cited by examiner

*Primary Examiner*—Thomas D. Lee
*Assistant Examiner*—Stephen Brinich
(74) *Attorney, Agent, or Firm*—Fitzpatrick, Cella, Harper & Scinto (57) ABSTRACT

Disclosed is an image reading apparatus in which the band width for reading by one scanning is variable in accordance with the original size, the reading mode, etc. R, G, and B image data of the k-th band is successively read in one-band width to store image data R1, G1, and B1 of pixel coordinates $X(n, m)$. Then, the original is fed so as to cause partial overlapping of the (k+1)-th band with a lower predetermined pixel region of the k-th band, and R, G, and B image data of the (k+1)-th band is read in one-band width to successively store image data R2, G2, and B2 of pixel coordinates $X(n, m')$. The image data obtained through overlap reading of the k-th band and the (k+1)-th band is averaged to calculate correction image data, which is transferred to a host computer along with along other image data which has not been averaged as read image data. And, it is possible to optimize reading time according to the kind of original, reading mode, etc., without involving a deterioration in image quality.

2 Claims, 6 Drawing Sheets

IMAGE READING APPARATUS

BACKGROUND OF THE INVENTION

1. Field of the Invention

The present invention relates to an image reading apparatus.

2. Related Background Art

An image processing apparatus is known in which either a recording head or a scanner unit is mounted on a carriage and which records image data from a computer on recording paper while cooperating with a paper conveying system or reads image data recorded on an original.

The image processing apparatus adopts a recording system, such as an ink-jet recording system, a dot-impact recording system, or a thermal transfer recording system. When outputting image data onto recording paper, the recording head is attached to the carriage, which is reciprocated to record the image data on the recording paper. On the other hand, when reading the image data of an original, the scanner unit is mounted on the carriage instead of the recording head, and the carriage is reciprocated to perform image data reading processing.

In such an image processing apparatus, the distance between the original and the scanner unit is first adjusted by using, for example, a white reference sheet. After adjusting the distance between the original and the reference sheet, image data is read on a predetermined pixel region basis, which is a band unit. That is, when reading image data in the monochrome mode, one band (for example, 256 pixels) of image data is read by using a green light source. When reading image data in the full color mode, one band of image data, which is successively irradiated with lights from a red (R) light source, a green (G) light source, and a blue (B) light source, is read successively. The read image data is stored in a memory unit, and then transferred to an information processing apparatus, such as a host computer.

It is to be noted, however, that the distance between the original image and the scanner unit, which is adjusted in advance as stated above, is subject to variation depending on the kind of original, which may be a cut paper sheet, a photograph, a postcard, etc. Thus, when reading image data recorded on an original which is of a type different from the reference sheet, a so-called "band unevenness" is generated, resulting in a deterioration in the quality of the image read.

In view of this, an overlap reading is performed in which a predetermined lower region of one band that can be read by one scanning is overlapped with a predetermined upper region of the next band.

However, even when the above-mentioned overlap reading is performed, the reading processing can take an excessively long time depending on the kind of original, recording mode, etc. since the band width that allows reading by one main scanning, the band region subjected to overlap reading, etc. are set independently of the kind of original, reading mode, etc.

SUMMARY OF THE INVENTION

The present invention has been made in view of the above problem. It is accordingly an object of the present invention to provide an image reading apparatus which is capable of optimizing reading time according to the kind of original, reading mode, etc., without involving a deterioration in image quality.

To achieve the above object, there is provided, in an aspect of the present invention, an image reading apparatus comprising:

an image reading means for reading image data on a predetermined pixel region basis;

a storage means for storing the image data; and a read pixel changing means for changing the predetermined pixel region according to the storage capacity of the storage means.

In another aspect of the present invention, there is provided an image reading apparatus comprising:

a reading head for reading an original image by using a line sensor;

a moving means for effecting a relative movement of the reading head and the original image;

a control means for controlling the moving means so as to repeat a relative movement in a first direction perpendicular to the direction in which the line sensor is arranged and a relative movement in a second direction in which the line sensor is arranged;

a storage means for storing image data read by the reading head; and a setting means for setting the reading width of the reading head in one relative movement in the first direction on the basis of the storage capacity of the storage means.

In still another aspect of the present invention, there is provided an image reading apparatus comprising:

a reading head for reading an original image by using a line sensor;

a moving means for effecting a relative movement of the reading head and the original image;

a control means for controlling the moving means so as to repeat a relative movement in a first direction perpendicular to the direction in which the line sensor is arranged and a relative movement in a second direction in which the line sensor is arranged; and a setting means for setting the reading width of the reading head in one relative movement in the first direction on the basis of the resolution with which the original image is read.

In a further aspect of the present invention, there is provided an image reading apparatus comprising:

a reading head for reading an original image by using a line sensor;

a moving means for effecting a relative movement of the reading head and the original image;

a control means for controlling the moving means so as to repeat a relative movement in a first direction perpendicular to the direction in which the line sensor is arranged and a relative movement in a second direction in which the line sensor is arranged; and a setting means for setting the reading width of the reading head in one relative movement in the first direction on the basis of the size of the original.

In a further aspect of the present invention, there is provided a storage medium for storing a program for controlling an image reading apparatus so as to read image data on a predetermined pixel region basis, by an image reading means store the read image data in a storage means, and change the predetermined pixel region in accordance with the storage capacity of the storage means.

In a further aspect of the present invention, there is provided a storage medium for storing a program for controlling an image reading apparatus comprising a reading head for reading an original image by using a line sensor; a moving means for effecting a relative movement of the reading head and the original image; a control means for controlling the moving means so as to repeat a relative movement in a first direction perpendicular to the direction in which the line sensor is arranged and a relative movement in a second direction in which the line sensor is arranged; and a storage means for storing image data read by the reading head, wherein the program includes a setting module for setting the reading width of the reading head in one relative movement in the first direction on the basis of the storage capacity of the storage means.

In a further aspect of the present invention, there is provided a storage medium for storing a program for controlling an image reading apparatus comprising a reading head for reading an original image by using a line sensor; a moving means for effecting a relative movement of the reading head and the original image; and a control means for controlling the moving means so as to repeat a relative movement in a first direction perpendicular to the direction in which the line sensor is arranged and a relative movement in a second direction in which the line sensor is arranged, wherein the program includes a setting module for setting the reading width of the reading head in one relative movement in the first direction on the basis of the resolution with which the original image is read.

In a further aspect of the present invention, there is provided a storage medium for storing a program for controlling an image reading apparatus comprising a reading head for reading an original image by using a line sensor; a moving means for effecting a relative movement of the reading head and the original image; and a control means for controlling the moving means so as to repeat a relative movement in a first direction perpendicular to the direction in which the line sensor is arranged and a relative movement in a second direction in which the line sensor is arranged, wherein the program includes a setting module for setting the reading width of the reading head in one relative movement in the first direction on the basis of the size of the original.

Due to the above-described arrangement of the present invention, it is possible to make variable the predetermined pixel unit, which corresponds to the reading width for one scanning, so that it is possible to optimize the reading time according to the kind of original, reading mode, etc., thereby making it possible to obtain high-quality image data in a short time.

Other features of the present invention will become apparent from the following description of an embodiment of the invention.

DESCRIPTION OF THE PREFERRED EMBODIMENTS

An embodiment of the present invention will now be described in detail with reference to the drawings.

Figure 1:
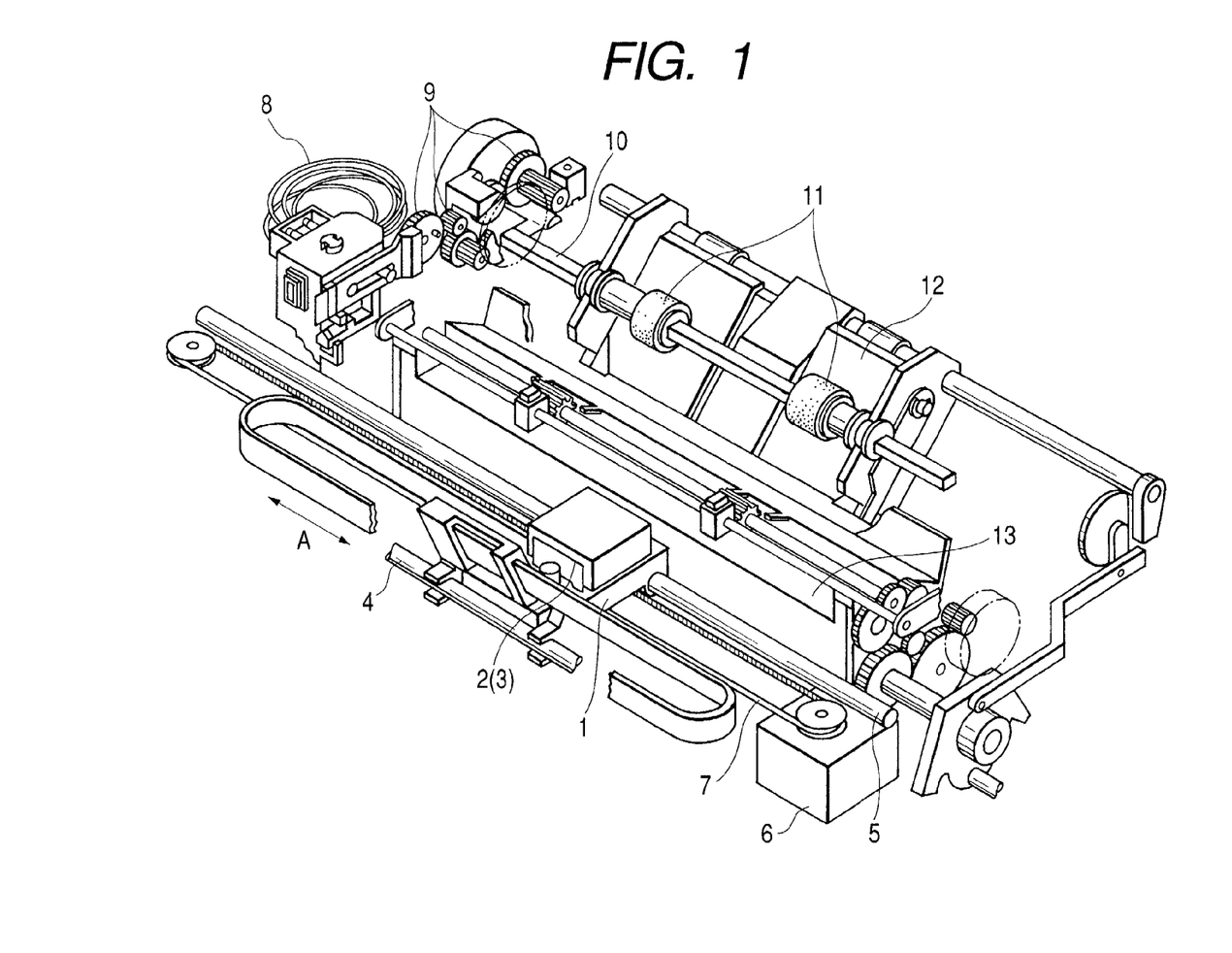
FIG. 1 is a perspective view showing the outward appearance of an ink-jet printer to which the present invention is applied.

FIG. 1 is a perspective view showing the outward appearance of an ink-jet printer constituting an embodiment of the image processing apparatus of the present invention.

In the drawing, a reference numeral 1 indicates a carriage to which a scanner unit 2 for image reading or a recording head 3 for image recording is detachably attached. The carriage 1 is guided by two parallel guide shafts 4 and 5 and thereby reciprocates in the directions indicated by arrows A (which are the main scanning directions with respect to the paper) on a drive belt 7 driven by a carriage motor 6.

A reference numeral 8 indicates a line feed motor. Driving the line feed motor 8 causes an appropriate number of gears 9 and a paper presser bar 10 connected thereto to rotate, whereby two paper presser members 11 arranged substantially in the middle portion of the paper presser bar 10 are rotated, thereby guiding an original or recording paper fed to paper supports 12 toward a platen 13.

Figure 2:
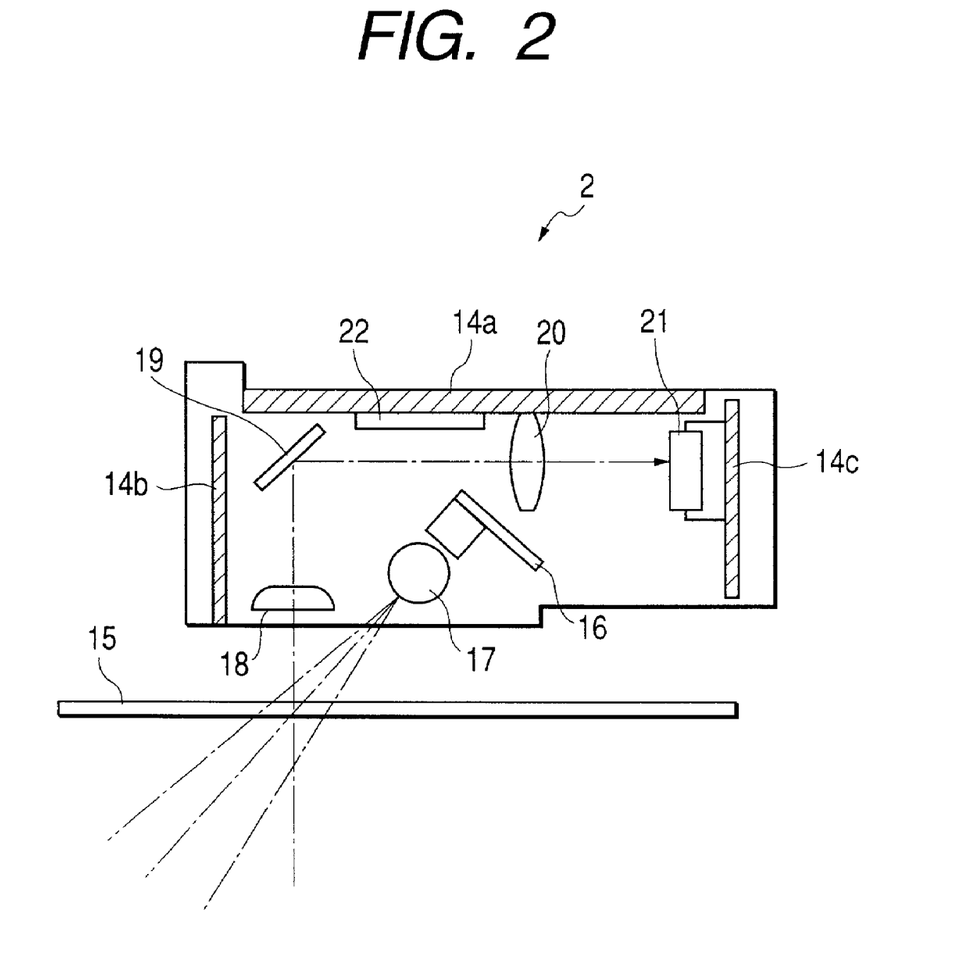
FIG. 2 is a structural drawing showing in detail the inner construction of a scanner unit to which the present invention is applied.

FIG. 2 is a diagram showing the inner construction of the scanner unit 2 in detail.

The scanner unit comprises electric circuit boards 14a through 14c on which electronic parts, such as capacitors, resistors, coils, and oscillators, are mounted, a light emitting diode (LED) 16 having light sources of the three colors of R, G, and B and adapted to appropriately illuminate an original 15, a rod lens 17 through which the light from the LED 16 is transmitted, a field lens 18 through which reflected light from the original 15 is transmitted, a mirror 19, an image formation lens 20 for condensing the reflected light from the mirror 19, a CCD 21 serving as an optical sensor for converting the optical image transmitted through the image formation lens 20 to an electric signal through photoelectric conversion, and a control circuit portion 22 attached to the electric circuit board 14a. The CCD 21 is attached to the electric circuit board 14c.

Figure 3:
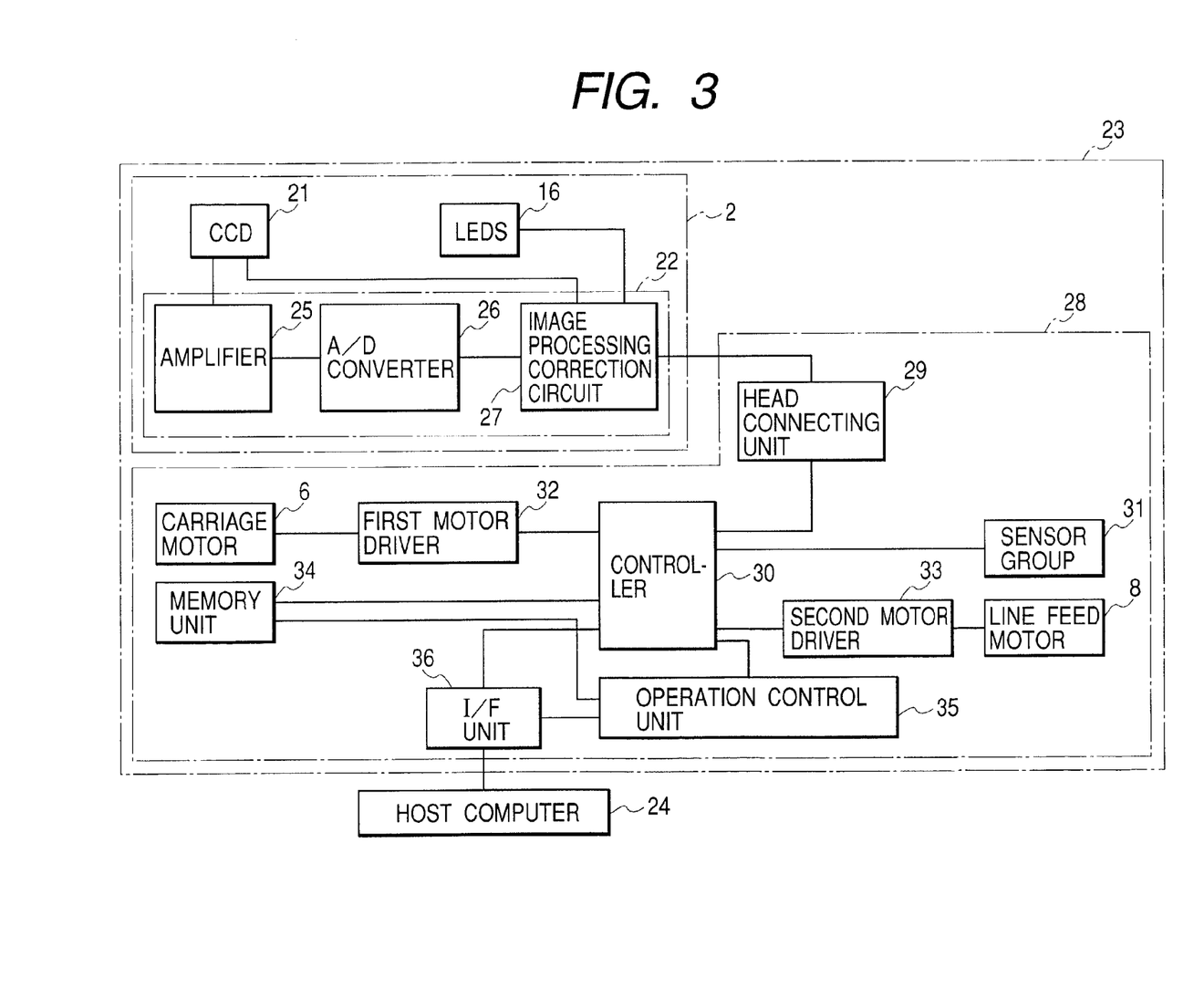
FIG. 3 is a block diagram showing the control system of an image processing system according to the present invention.

FIG. 3 is a block diagram showing the control system of the ink-jet printer when the scanner unit 2 is attached to the carriage 1. The ink-jet printer 23 is connected to a host computer 24.

More specifically, the control circuit portion 22 of the scanner unit 2 comprises an amplifier 25 for amplifying an analog electric signal output from the CCD 21, an A/D converter 26 for converting the analog electric signal amplified by the amplifier 25 to a digital electric signal, and an image processing correction circuit 27 for performing various kinds of correction processing on the image data converted to the digital electric signal on the basis of output signals from the CCD 21 and the LED 16. The image data output from the image processing correction circuit 27 is transmitted to an apparatus main body portion 28.

The apparatus main body portion 28 comprises a head connecting unit 29 which is electrically connected to the scanner unit 2 or the recording head 3 when the scanner unit 2 or the recording head 3 is attached, a controller 30 to which the image data read by the scanner unit 2 is input and which controls the entire apparatus, a sensor group 31 for supplying the controller 30 with the detection results of various sensors, such as a paper sensor, a first motor driver 32 for driving the carriage motor 6 in accordance with a command from the controller 30, a second motor driver 33 for driving the line feed motor 8 in accordance with a command from the controller 30, a memory unit 34 for temporarily storing the image data read by the scanner unit 2 (including the image data obtained by overlap reading), an operation control unit 35 for performing a predetermined compression processing on the image data stored in the memory unit 34, and an interface (I/F) unit 36 for performing interface operation with the host computer 24. The image data compressed by the operation control unit 35 is transferred to the host computer 24 through the I/F unit 36.

In this ink-jet printer, arranged as described above, when the recording head 3 is attached to the carriage 1, the carriage 1 is reciprocated in the directions of the arrows A while feeding the recording paper toward the platen 13 by driving the line feed motor 8, whereby one-band image data is output to the recording paper on the platen 13.

On the other hand, when the scanner unit 2 is attached to the carriage 1, the line feed motor 8 is driven to feed the original onto the platen 13 by an amount corresponding to one band, i.e., the width of the portion of the original that can be read by one scanning, and the carriage 1 is reciprocated in the directions of the arrows A. In the monochrome mode, only the green (G) LED of the LEDs 16 is lit to read the original image data under the light of G. In the full color mode, the LEDs 16 of the red (R), green (G), and blue (B) light sources are lit successively, switching them from one to the other, and the scanner unit 2 mounted on the carriage 1 is reciprocated three times in the directions of the arrows A to thereby read one-band original image data in the three colors of R, G, and B.

Then, the line feed motor 8 is driven to feed the original toward the platen 13 by a predetermined distance such that a lower region of the band that has been read overlaps with an upper region of the band to be read next. In this way, while performing overlap reading on a part of the original image by the scanner unit 2, the entire original image is read. In this embodiment, one band is of a reading width corresponding to 256 pixels at the maximum, and the band width can be varied within that range.

Figure 4:
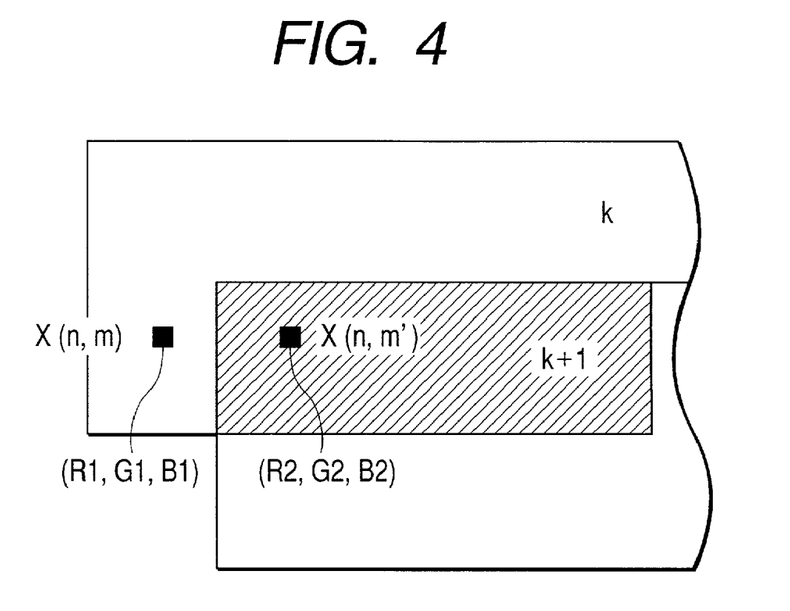
FIG. 4 is a schematic diagram showing the processing when "overlap reading" of image data is performed in the full color mode.

FIG. 4 is a schematic diagram showing how "overlap reading" of image data is performed in the full color mode.

The R image data of the k-th band (k=1, 2, . . . ) is read in one-band width (for example, a width of 128 pixels), and image data R1 of pixel coordinates X(n, m) (n=1, 2, . . . ; m=1, 2, . . . ) is stored in the memory unit 34. Similarly, the G image data and the B image data of the k-th band are read in one-band width, and image data G1 and image data B1 of the pixel coordinates X(n, m) are successively stored in the memory unit 34.

Thereafter, the original is fed toward the platen 13 by a predetermined width which is set in accordance with the kind of original (cut paper sheet, postcard, photograph, etc.) and the reading of the next band, i.e., the (k+1)-th band, is performed such that the (k+1)-th band partially overlaps with the image data of the k-th band.

The image data of the (k+1)-th band is read in one-band width, and the image data R2 of pixel coordinates X(n, m') (n=1, 2, . . . ; m'=0, 1, . . . ) is stored in the memory unit 34. Similarly, the G image data and the B image data of the (k+1)-th band are successively read in one-band width, and the image data G2 and the image data B2 of the pixel coordinates X(n, m') are stored in the memory unit 34.

And, the image data (that is stored in the memory unit 34) obtained through the overlap reading of the k-th band and the (k+1)-th band is averaged as shown in the following equations (1) through (3) to calculate correction image data R0, G0, and B0.

$$R0=(R1+R2)/2 \tag{1}$$

$$G0=(G1+G2)/2 \tag{2}$$

$$B0=(B1+B2)/2 \tag{3}$$

And, the image data that has thus undergone averaging processing through a series of operations is transferred to the host computer 24 as read image data along with other image data that has not undergone averaging processing.

Figure 8:
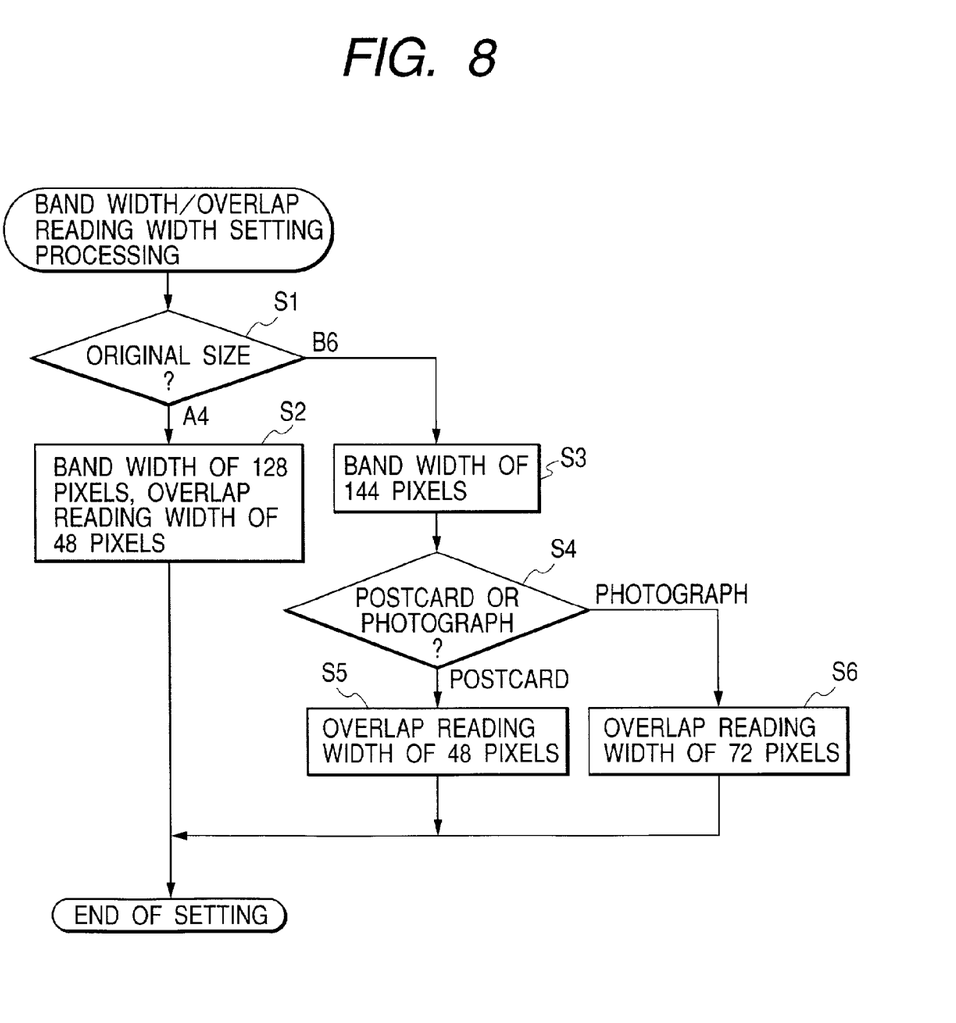
FIG. 8 is a flowchart illustrating a band width setting processing and an overlap reading width setting processing.

FIG. 8 is a flowchart illustrating the band width setting and overlap reading width setting operations.

First, in step S1, the size of the original to be read is detected. When the original size detected is A4, the procedure advances to step S2, in which the band width for reading by one main scanning is set to 128 pixels, and the overlap reading width is set to 48 pixels.

When the original size detected is smaller than A4 as in the case of a postcard, a service size photograph or the like (which approximately corresponds to B6), the procedure advances to step S3, in which the band width for reading by one main scanning is set to 144 pixels.

Next, the procedure advances to step S4, in which a judgment is made as to whether the original is a postcard or a photograph. When the original is found to be a postcard, the procedure advances to step S5, in which the overlap reading width is set to 48 pixels. When the original is found to be a service size photograph, the procedure advances to step S6, in which the overlap reading width is set to 72 pixels.

The setting processing is completed as described above.

Figure 5:
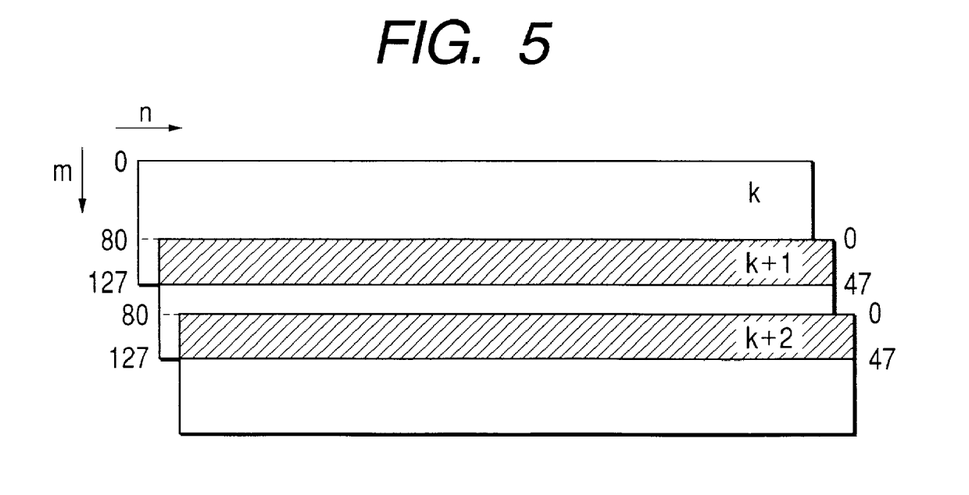
FIG. 5 is a schematic diagram showing the processing when image data of an A4 size original is read.

FIG. 5 is a diagram schematically illustrating a process for reading image data recorded on an A4 size original (cut paper sheet). Here, as stated above, the band width for reading by one main scanning is set to 128 pixels. The overlap reading width is set to 48 pixels.

First, the image data of the k-th band is read in a 128 pixel width, and the image data thus read is stored in the memory unit 34. Next, the original is fed by 80 pixels, and the image data of the (k+1)-th band thus fed is read in a 128 pixel width, and the image data read is stored in the memory unit 34. And, the image data of the region where "overlap reading" has been performed is averaged to calculate correction image data. That is, the pixel data of the 80th pixel of the k-th band and the image data of the 0th pixel of the (k+1)-th band are averaged in accordance with equations (1) through (3) to calculate correction image data. Similarly, the image data of the 81st through 127th pixels of the k-th band and the image data of the 1st to 27th pixels of the (k+1)-th band are averaged respectively to calculate correction image data. A similar processing is performed on the image data of the (k+2)-th band onward.

After this, the correction image data is transferred to the host computer 24 along with the image data of the region where no "overlap reading" has been performed, and is stored in the storage portion of the host computer 24 as the read data of the original image.

When the original is a photograph or a postcard, whose surface area is smaller than A4 size, the moving distance of the carriage 1 is small, and the amount of image data stored in the memory unit 34 is small, so that there is a margin of storage capacity in the memory unit 34. Thus, it is possible to increase the band width of one band by increasing the original feed amount accordingly, whereby it is possible to increase the apparent image data reading speed, thereby achieving a reduction in reading time.

Figure 6:
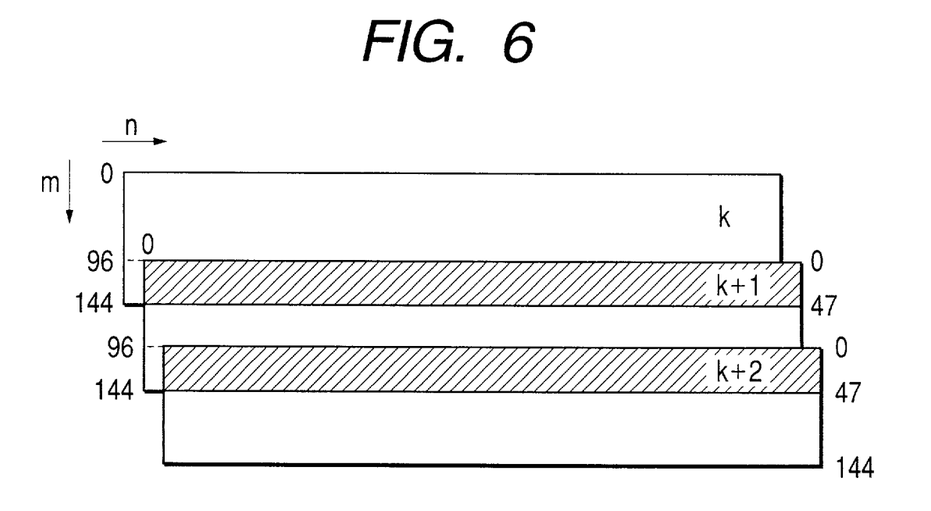
FIG. 6 is a schematic diagram showing the processing when the width of one band corresponds to 144 pixels.

FIG. 6 is a diagram schematically illustrating a process for reading image data recorded on a postcard. As stated above, the band width for reading by one main scanning is set to a width corresponding to 144 pixels. The overlap reading width is set to a 48 pixel width.

The image data of the k-th band is read in the 144 pixel width, and the image data thus read is stored in the memory unit 34. Then, the original is fed by 96 pixels, and the image data of the (k+1)-th band thus fed is read in the 144 pixel width, and the image data read is stored in the memory unit 34. And, in accordance with equations (1) through (3), averaging processing is performed on the image data of the 96th through 144th pixels of the k-th band and the image data of the 0th through 47th pixels of the (k+1)-th band respectively, which have undergone overlap reading, to calculate correction image data. A similar processing is performed on the image data of the (k+2)-th band onward.

And, the correction image data is transferred to the host computer 24 along with the image data of the region where no "overlap reading" has been performed, and is stored in the storage portion of the host computer 24 as the read data of the original image.

In this way, when the amount of image data stored in the memory unit 34 is small, depending on the original size and the kind of image recorded on the original, there is a margin of storage capacity in the memory unit 34, so that it is possible to increase the number of pixels for reading in one band, thereby accelerating the image reading processing.

Figure 7:
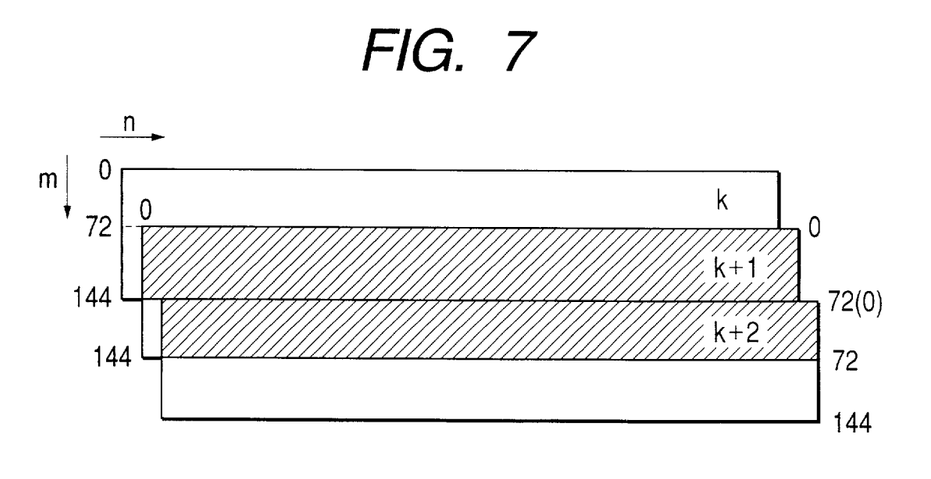
FIG. 7 is a schematic diagram showing the processing when the width of one band corresponds to 144 pixels and the band region for overlap reading is enlarged.

FIG. 7 is a diagram schematically showing a process for reading a service size photograph. As stated above, the band width for reading by one main scanning is set to a width corresponding to 144 pixels. The overlap reading width is expanded to a 72 pixel width.

The image data of the k-th band is read in the 144 pixel width, and the image data read is stored in the memory unit 34. Then, the original is fed by 72 pixels, and the image data of the (k+1)-th band thus fed is read in the 144 pixel width, and the image data read is stored in the memory unit 34. And, in accordance with equations (1) through (3), averaging processing is performed on the image data of the 72nd through 144th pixels of the k-th band and the image data of the 0th through 72nd pixels of (k+1)-th band, which have undergone overlap reading, to calculate correction image data. A similar processing is performed on the image data of the (k+2)-th band onward.

And, the correction image data is transferred to the host computer 24 along with the image data on which no "overlap reading" has been performed, and is stored in the storage portion of the host computer 24 as the read data of the original image.

In this way, in FIG. 7, not only is the pixel width of one band is larger as compared with that in the case of an A4 size original, but "overlap reading" is performed in all the regions, so that it is not only possible to shorten the reading time in accordance with the paper size, but also to perform a high-quality image reading processing involving less band unevenness.

The present invention is not restricted to the above-described embodiment. While in the above embodiment the band width is variable according to the kind of original (cut paper sheet, postcard, photograph, etc.), it is to be noted that even if the original is the same size, there is a margin of storage capacity in the memory unit 34 when the image data is read with a resolution set lower, so that it is possible to enlarge the band width. Thus, also when the image data reading processing is performed with a resolution set lower, it is possible to shorten the reading time, without involving band unevenness. That is, it is also possible to set the band width and the overlap reading width according to the reading resolution.

Further, it is also to be noted that when image data is read in the monochrome mode, memory space of the memory unit 34 to be used is less as compared to the case in which reading is performed in the full color mode, so that there is a margin of storage capacity in the memory unit 34. Thus, in such a case also, it is possible to increase the band width to achieve a reduction in reading time. That is, it is also possible to set the band width and the overlap reading width according to the reading mode.

It is also possible to adopt an arrangement in which an arbitrary storage medium storing a program for executing the control of the ink-jet printer 23, which constitutes the above-described image reading apparatus, supplies the program to the ink-jet printer 23 so that the controller 30 executes the program. Examples of the storage medium supplying the above program include a floppy disk, a hard disk, an optical disk, a magneto-optical disk, a CD-ROM, a CD-R, a magnetic tape, a non-volatile memory card, and a ROM.

Further, instead of the controller 30 of the ink-jet printer 23, it is also possible to use a circuit (not shown) capable of performing a similar operation to thereby realize the above-described embodiment.

Further, the above-mentioned program supplied by the storage medium may be written to a memory (not shown) provided in a functional expansion board (not shown) inserted into the computer 24, a functional expansion unit (not shown) connected to the computer 24 or the like. Then, a CPU or the like (not shown) provided in the functional expansion board, the functional expansion unit or the like may execute a part or all of the above program.

Apart from this, an OS or the like operating in the computer 24 may execute a part or all of the above program.

As described in detail above, in accordance with the present invention, a predetermined pixel unit which is the reading width for one scanning is variable according to the condition of the use of the memory, so that it possible to optimize the reading time according to the kind of original, the reading mode, etc. while avoiding generation of band unevenness, thereby making it possible to obtain high-quality image data in a short time.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   an image reading means for reading image data on a predetermined pixel region basis;
   a storage means for storing the image data; and
   a read pixel changing means for changing the predetermined pixel region according to the storage capacity of said storage means,
   wherein said image reading means performs overlap reading on a part of adjacent predetermined pixel regions, and
   wherein the overlap reading range is changed in accordance with the predetermined pixel region changed by said read pixel changing means.

2. An image reading apparatus comprising:
an image reading means for reading image data on a predetermined pixel region basis, wherein the image reading means performs overlap reading on a part of adjacent predetermined pixel regions;
a storage means for storing the image data;
a read pixel changing means for changing the predetermined pixel region according to the storage capacity of said storage means; and
an averaging means for averaging image data obtained through overlap reading.

* * * * *

UNITED STATES PATENT AND TRADEMARK OFFICE
CERTIFICATE OF CORRECTION

PATENT NO. : 7,002,705 B2
APPLICATION NO. : 09/879195
DATED : February 21, 2006
INVENTOR(S) : Akihiko Nakatani et al.

It is certified that error appears in the above-identified patent and that said Letters Patent is hereby corrected as shown below:

ON THE TITLE PAGE
At Item (73), Assignee, "Canon Research Kaisha" should read
--Canon Kabushiki Kaisha--.

At Item (57), Abstract, line 14, "with along" should read --with--.

COLUMN 7
Line 54, "band is" should read --band--.

COLUMN 8
Line 42, "possible" should read --is possible--.

Signed and Sealed this

Seventeenth Day of October, 2006

JON W. DUDAS
*Director of the United States Patent and Trademark Office*